United States Patent

[11] 3,569,733

[72] Inventors Richard C. Weischedel
Camillus, N.Y.;
Robert A. Lux, Toms River, N.J.
[21] Appl. No. 694,282
[22] Filed Dec. 28, 1967
[45] Patented Mar. 9, 1971
[73] Assignee General Electric Company

[54] REVERSIBLE COUNTER CIRCUIT UTILIZING TUNNEL DIODES
6 Claims, 3 Drawing Figs.

[52] U.S. Cl. .......... 307/222, 307/225, 307/227, 307/286, 307/322
[51] Int. Cl. .......... H03k 23/16
[50] Field of Search .......... 307/220, 222, 223, 227, 286, 225, 322

[56] References Cited
UNITED STATES PATENTS 3,094,631 6/1963 Davis, Jr. .......... 307/224
3,184,614 5/1965 Harrison, Jr. .......... 307/222
3,258,611 6/1966 Candilis .......... 307/227
3,263,093 7/1966 Erdmann .......... 307/228
3,201,610 8/1965 Ulrich .......... 307/286X

*Primary Examiner*—Stanley D. Miller
*Attorneys*—Frank L. Neuhauser, Oscar B. Waddell, Carl W. Baker and Joseph B. Forman

ABSTRACT: A reversible counter circuit (sometimes called an up-down counter) is disclosed, utilizing a plurality of tunnel diodes connected in series with an upcount pulse switch in a constant current path, in parallel with a count capacitor. A downcount pulse switch is connected, in a constant current path, across the count capacitor. The voltage charge on the count capacitor shifts up or down in incremental steps in response to the occurrence of the upcount pulses and the downcount pulses, and the proper number of tunnel diodes automatically turn "on," upon the occurrence of each count pulse, so as to fix the voltage on the count capacitor at accurately determined values representative of the counts. The count voltage thus always varies in accurately fixed incremental steps and is immune to any cumulative errors in count values.

INVENTORS:
RICHARD C. WEISCHEDEL,
ROBERT A. LUX,
BY Norman C. Fulmer
THEIR ATTORNEY.

REVERSIBLE COUNTER CIRCUIT UTILIZING TUNNEL DIODES

BACKGROUND OF THE INVENTION

Reversible counters, or up-down counters, are employed for various purposes, such as analyzing electrical signals. A reversible counter may be used for accurately determining when the peak value has occurred of an electrical signal derived from an earthquake, lightning, explosion, or other phenomena. For example, a sequence of "up" counts, indicative of a positive slope of the signal, followed by a certain number of "down" counts, indicates that the peak value of the signal has occurred. More than one downcount is required in order to prevent false indications due to random downcount effects of noise of the signal. Positive and negative slope detector determine the signal slope over discrete intervals, and apply "up" and "down" count pulses to the reversible counter.

One type of reversible counter is a ring counter having a plurality of sequentially connected flip-flop stages. The up and down count pulses are applied to these stages, via special steering logic circuits, so that an upcount pulse shifts the ring counter in the forward direction and a downcount pulse shifts the ring counter in the reverse direction.

Another type of reversible counter utilizes complicated circuitry to cause the voltage charge on a capacitor to shift up or down in value in response to incoming upcount pulses and downcount pulses.

The aforesaid prior art arrangements are relatively complicated and expensive, and the type of counter which changes the voltage charge on a capacitor is subject to undesirable cumulative errors in the capacitor count voltage over a period of time.

SUMMARY OF THE INVENTION

Objects of the invention are to provide an improved reversible counter that is relatively simple, inexpensive, reliable and which is not subject to cumulative errors in count values.

The improved reversible counter of the invention comprises, briefly and in a preferred embodiment, a plurality of tunnel diodes connected in series with an upcount pulse switch in a constant current path. A count capacitor is connected in parallel with the tunnel diodes and the upcount pulse switch. A downcount pulse switch is connected, in a constant-current path, across the count capacitor. The voltage charge on the count capacitor shifts up or down in incremental steps, in response to the occurrence of upcount pulses and downcount pulses applied to the upcount pulse switch and the downcount pulse switch, respectively. The proper number of the aforesaid tunnel diodes turn "on," automatically, upon the occurrence of each count pulse, so as to fix the count voltage on the count capacitor at accurately determined values representative of the counts. Thus, the count voltage always varies in accurately fixed incremental steps and is immune to any cumulative errors in count values.

DESCRIPTION OF THE PREFERRED EMBODIMENT

Figure 1:
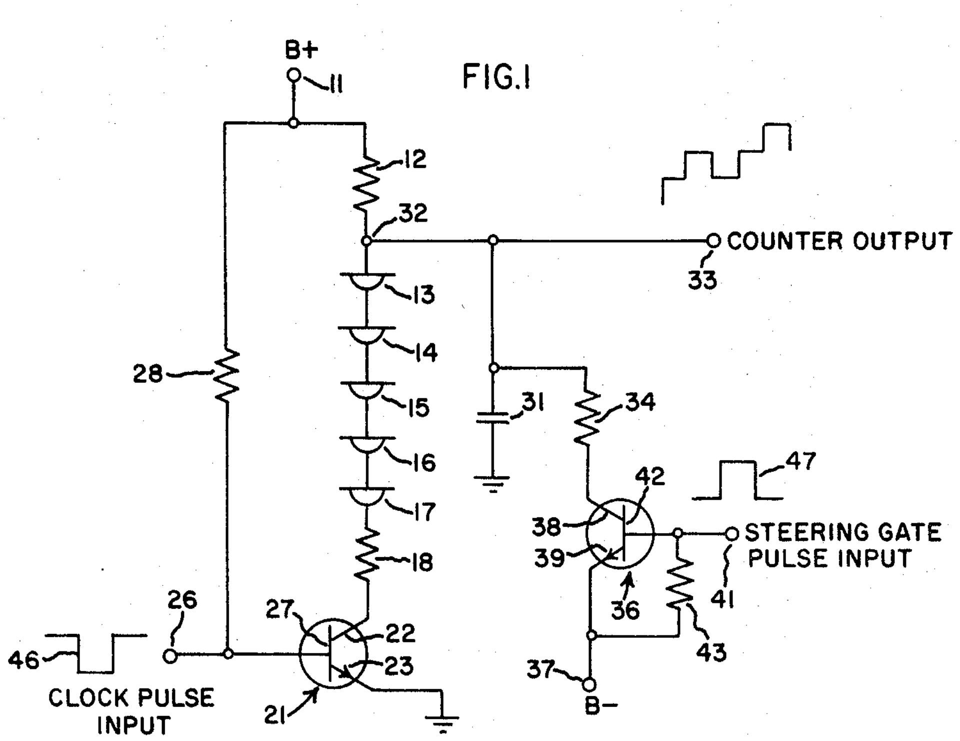
FIG. 1 is an electrical schematic diagram of a preferred embodiment of the invention.

In FIG. 1, a series circuit is connected between a terminal 11 of positive-polarity operating voltage, and electrical ground, comprising in the order named a resistor 12, a plurality of tunnel diodes 13, 14, 15, 16, and 17; a resistor 18, and the collector-emitter path of a transistor 21, the collector 22 being connected to the resistor 18 and the emitter 23 being connected to electrical ground. A clock pulse (upcount pulse) input signal terminal 26 is connected to the base electrode 27 of the transistor 21, and a biasing resistor 28 is connected between the voltage terminal 11 and the base electrode 27.

A count capacitor 31 is connected between electrical ground and the junction 32 of the resistor 12 and the adjacent tunnel diode 13. A counter output signal terminal 33 is connected to the aforesaid junction 32. A resistor 34 and the collector-emitter path of a transistor 36 are connected between the junction 32 and a terminal 37 of negative-polarity operating voltage, the collector 38 being connected to the resistor 34 and the emitter 39 being connected to the voltage terminal 37. A steering gate pulse (downcount) input signal terminal 41 is connected to the base electrode 42 of the transistor 36, and a biasing resistor 43 is connected between the signal input terminal 41 and the operating voltage terminal 37.

In the particular embodiment shown, the clock pulses 46 which are applied to the upcount pulse input terminal 26, are generated by a clock pulse generator, commencing upon the occurence of a signal wave of which the occurrence of the peak thereof is to be detected by the counter circuit, and the steering gate input pulses 47 which are applied to the downcount input terminal 41, are derived from a negative-slope detector circuit in response to the occurrence of any incremental negative slopes of the signal to be measured, it being assumed that this signal initially has a positive going slope.

Figures 2, 3:
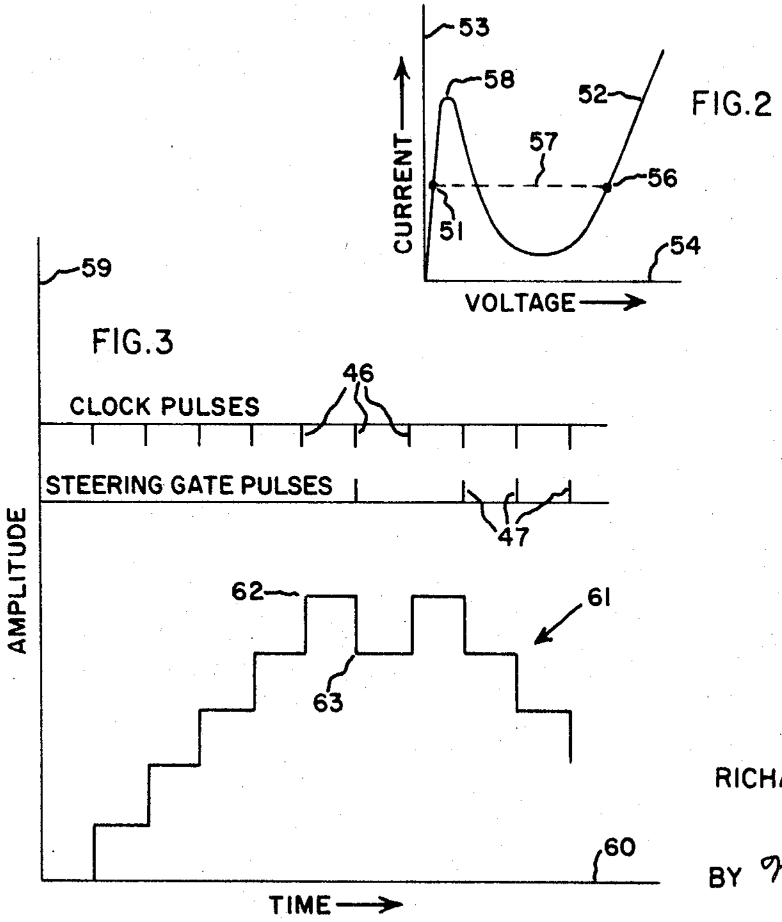
FIG. 2 is a representative characteristic curve of a tunnel diode.
FIG. 3 is a graphical representation of signals occuring in the circuit of FIG. 1.

The operation of the circuit will now be described. The resistor 12 has a relatively large value of resistance compared with the resistance of the tunnel diodes 13 through 17, the resistor 18, and the collector-emitter path of the transistor 21, so that this resistor 12, in conjunction with the voltage supplied at terminal 11, effectively constitutes a constant current source. The resistor 18, of relatively small resistance value, is utilized only when necessary to protect the tunnel diodes from excessive current. The transistor 21 is biased so as to be normally "on," and thus current normally flows through the transistor 21 and the tunnel diodes 13 through 17, the total resistance thereof being so relatively low in value that, initially, the voltage on capacitor 31 is substantially zero. In this initial condition, each of the tunnel diodes 13 through 17 is operating at the low voltage point 51 on their characteristic curves 52 as shown in FIG. 2, in which the characteristic curve 52 is plotted as a function of current 53 (vertical axis) versus voltage 54 (horizontal axis).

Upon the occurrence of the first clock pulse or upcount pulse 46, which negative polarity, the transistor 21 is rendered relatively less conductive to a degree that all of the tunnel diodes 13 through 17 are turned off, i.e. switched to substantially zero voltage operating on their characteristic curves 52. During the duration of the clock pulse 46, the voltage charge increases since the current through resistor 12 now flows into capacitor 31. The magnitude of the voltage increase is determined by the time duration of the clock pulse. Upon termination of the first clock pulse 46, the transistor 21 is again rendered highly conductive, and the increment of voltage that has been placed on capacitor 31 affects the chain of tunnel diodes 13 through 17, so that all but one of them return to the low voltage point 51, and one of them shifts to a high voltage point 56, thereby accurately fixing the voltage charge on capacitor 31 at substantially the voltage value of point 56. The low and high voltage values 51 and 56 lie on the current value 57 established by the aforesaid constant current source. Preferably this constant current value 57 is approximately one-half of the peak current value 58 of the characteristic curve 52. It will be realized that in order to achieve the aforesaid action, the clock pulses 46 must have a duration that is proper with respect to the voltage characteristics of the tunnel diodes 13 through 17. For example, in a typical circuit, the point 56 on the tunnel diode characteristic curve represents 400 millivolts, and the clock pulses 46 have a width or duration such that each of these pulses will cause the current through resistor 12 to add approximately 400 millivolts of charge to the count capacitor 31. As each clock pulse 46 adds an additional 400 millivolts charge to the count capacitor 31, one more of the tunnel diodes 13 through 17 will shift to the high voltage point 56, in the manner described above, thus maintaining the capacitor 31 at a voltage charge of an integral multiple of 400 millivolts, since the voltage point of 56 of each of the tunnel diodes represents a voltage drop of 400 millivolts thereacross. Even if the clock pulse width should vary, or should not quite be the optimum value, the action of the tunnel diodes will insure that the incremental counting steps of voltage on the capacitor 31 will be in integral multiples of 400 millivolts. For example, if the pulse width is longer than the optimum value the increment of voltage charge on capacitor 31 will be higher than 400 millivolts, and the operating point on the tunnel diodes will be temporarily higher than point 56. Since the constant current source establishes point 56, the tunnel diodes will temporarily take greater current than is available from the constant current source. This excess current will be supplied by the capacitor 31 thereby reducing its voltage until operating point 56 is reached. A reverse self-correcting action occurs when the pulses are shorter than optimum duration, The circuit will thus count upwardly in incremental steps, as described, for as many steps as there are tunnel diodes 13 through 17, and in the example given will count up to five steps or counts.

The downcount transistor 36 is biased so as to be normally nonconductive, and the resistor 34 has a relatively high value of resistance so that it, in conjunction with the value of negative operating voltage at terminal 37, provides in effect a constant current source of approximately two times that supplied by resistor 12 whenever transistor 36 is rendered conductive. Whenever a steering gate pulse or downcount pulse 47 is applied to the terminal 41, the transistor 36 is rendered conductive. At this time both constant currents are on, and since the downcount current is twice the upcount current, capacitor 31 will be partially discharged. The magnitude of this voltage discharge on capacitor 31 is dependent on the duration of the pulse 47 which, when it occurs, is synchronous with the clock pulse 46. In the example shown, the duration of each pulse 47 is such as to cause a voltage drop of approximately 400 millivolts on the count capacitor 31. That is, upon the occurrence of each downcount pulse 47, the voltage on count capacitor 31 is reduced by 400 millivolts, and as a result of each occurrence thereof, one less of the tunnel diodes 13 through 17 will be at the relatively high voltage point 56, and one more of these tunnel diodes will be at the lower voltage operating point 51, so as to accurately lower the voltage of capacitor 31 by 400 millivolts.

Suitable widths of the count pulses depend on the value of count capacitor 31 and the constant current values, and vice versa.

In the example shown, the clock pulses or upcount pulses 46 occur repetitively, as shown in FIG. 3, and the downcount or steering gate pulses 47 occur only whenever a downcount is desired, and occur, when they do occur, coincidentally or synchronously with the clock pulses 46.

In FIG. 3, in which the vertical axis 59 represents signal amplitude and the horizontal axis 60 represents time, a count output signal 61 is shown, which would be produced in the circuit of FIG. 1 upon the occurrence of clock pulses 46 and steering gate pulses 47 as illustrated in FIG. 3. That is, the first five clock pulses 46 successively add incremental voltage counts until the voltage count value 62 is reached. Simultaneously with the occurrence of the sixth clock pulse 46, a steering gate pulse 47 occurs, which causes a downcount to the voltage value 63, in the manner described above. The seventh clock pulse 46 causes an upcount, and steering gate pulses 47 which occur simultaneously with the next three clock pulses cause successive increments of downcounts, as shown in FIG. 3. In the exemplary counter output signal 56 shown in FIG. 3, the first five successive upcounts are indicative of a positive slope of a signal being analyzed, the first downcount to the voltage count level 63 is caused by noise or other undesired signal effects, the next following upcount indicates that the signal being analyzed has not reached its peak for certain, and the next successive plurality of downcount increments indicate that the signal being analyzed has definitely passed its peak value, whereupon a timer circuit or alarm device is actuated as desired, indicative of the signal being analyzed having passed its peak value.

Greater or lesser numbers of tunnel diodes than shown in the preferred embodiment may be employed, depending upon a maximum number of counting increments desired. Even after such a circuit has been built, its count capacity can be increased by merely adding additional tunnel diodes in the series circuit. Since the characteristics of individual tunnel diodes vary slightly, it is not predictable as to which one of the tunnel diodes 13 through 17 will automatically shift to a higher or lower voltage point 56 or 51 for any particular counting increment, but this does not matter insofar as the invention is concerned, since the tunnel diodes are connected in series and it is the total voltage drop thereacross which accurately fixes, temporarily the count voltage on capacitor 31, so that the incremental counting steps are always accurately fixed and are not subject to any cumulative errors in count values.

While a preferred embodiment of the invention has been shown and described, various other embodiments and modifications thereof will be apparent to those skilled in the art, and will fall within the scope of invention as defined in the following claims.

We claim:

1. A pulse counter wherein the improvement comprises a constant-current path including a constant-current source, a plurality of tunnel diodes and a count-pulse actuated switch connected in series to form said constant-current path, and a count capacitor connected electrically in parallel with the part of said constant-current path which includes said tunnel diodes and said count-pulse actuated switch, said count-pulse actuated switch being operative upon the occurrence of each input count pulse to pass said constant-current flow to said count capacitor whereby all said tunnel diodes are turned off during the count pulse, said count-pulse actuated switch being further operative upon termination of such count pulse to pass said constant-current flow to said tunnel diodes thereby to turn on a number thereof dependent on the level of count capacitor charge as adjusted by capacitor current flow during the count pulse.

2. A counter as claimed in claim 1, in wherein said constant-current path constitutes a first of two such paths and said count-pulse actuated switch constitutes a first of two such switches, and wherein the second of said switches is connected in the second of said paths and in electrical parallel with said count capacitor, said first and second count-pulse actuated switches being respectively adapted to apply to or remove from said count capacitor voltage charges of mutually opposite polarities, whereby said counter is reversible.

3. A reversible counter as claimed in claim 2, in which said first count-pulse actuated switch comprises a first transistor connected with the collector-emitter path thereof in said first constant-current path, and means to apply upcount pulses to the base of said first transistor, and in which said second count-pulses actuated switch comprises a second transistor connected with the collector-emitter path thereof in said second constant-current path, and means to apply downcount pulses to the base of said second transistor.

4. A reversible counter as claimed in claim 2, in which said first constant-current path comprises a source of voltage and a first resistor connected in series with the circuit of said tunnel diodes and first count-pulse actuated switch, and in which said second constant-current path comprises a second resistor connected in series with said second count-pulse actuated switch, said first and second resistors having sufficiently high values of resistance to function as constant-current sources for said first and second constant-current path.

5. A reversible counter as claimed in claim 2, in which said tunnel diodes have substantially identical characteristic curves having a relatively high voltage-drop state and a relatively low voltage-drop state, said first and second count-pulse actuated switches being adapted to add and subtract voltage to and from said counter capacitor in increments substantially equal to said relatively high voltage-drop state of the individual tunnel diodes.

6. A reversible counter as claimed in claim 2, in which the current of said second constant-current path is twice the value of current of said first constant-current path, and means for applying count pulses to said first and second count-pulse actuated switches, the count pulses applied to said second count-pulse actuated switch occurring only simultaneously with count pulses applied to said first count-pulse actuated switch.